US007593535B2

(12) United States Patent
Shmunk

(10) Patent No.: US 7,593,535 B2
(45) Date of Patent: Sep. 22, 2009

(54) NEURAL NETWORK FILTERING TECHNIQUES FOR COMPENSATING LINEAR AND NON-LINEAR DISTORTION OF AN AUDIO TRANSDUCER

(75) Inventor: Dmitry V. Shmunk, Novosibirsk (RU)

(73) Assignee: DTS, Inc., Agoura Hills, CA (US)

( * ) Notice: Subject to any disclaimer, the term of this patent is extended or adjusted under 35 U.S.C. 154(b) by 350 days.

(21) Appl. No.: 11/497,484

(22) Filed: Aug. 1, 2006

(65) Prior Publication Data

US 2008/0037804 A1 Feb. 14, 2008

(51) Int. Cl.
*H04R 29/00* (2006.01)
*H04B 15/00* (2006.01)

(52) U.S. Cl. ........................ 381/94.9; 381/59; 381/94.1

(58) Field of Classification Search ................ 381/94.9, 381/94.1, 55, 56, 58, 59, 60; 704/226, 228, 704/E21.008
See application file for complete search history.

(56) References Cited

U.S. PATENT DOCUMENTS 5,185,805 A * 2/1993 Chiang ........................ 381/96
6,601,054 B1 * 7/2003 Lo et al. ........................ 706/30
6,766,025 B1 7/2004 Levy et al.

OTHER PUBLICATIONS

Norcross et al. "Adaptive Strategies for Inverse Filtering" Audio Engineering Society—Oct. 7-10, 2005.
Klippel et al. "Loudspeaker Nonlinearities—Causes, Parameters, Symptoms" Audio Engineering Society—Oct. 7-10, 2005.
Bard et al. "Compensation of nonlinearities of horn loudspeakers" Audio Engineering Society—Oct. 7-10, 2005.
Bard et al. "Nonlinearities Characterization" Audio Engineering Society—Oct. 28-31, 2004.

* cited by examiner

*Primary Examiner*—Vivian Chin
*Assistant Examiner*—Douglas J Suthers
(74) *Attorney, Agent, or Firm*—Blake A. Welcher; William L. Johnson; Eric A. Gifford

(57) ABSTRACT

Neural networks provide efficient, robust and precise filtering techniques for compensating linear and non-linear distortion of an audio transducer such as a speaker, amplified broadcast antenna or perhaps a microphone. These techniques include both a method of characterizing the audio transducer to compute the inverse transfer functions and a method of implementing those inverse transfer functions for reproduction. The inverse transfer functions are preferably extracted using time domain calculations such as provided by linear and non-linear neural networks, which more accurately represent the properties of audio signals and the audio transducer than conventional frequency domain or modeling based approaches. Although the preferred approach is to compensate for both linear and non-linear distortion, the neural network filtering techniques may be applied independently.

32 Claims, 14 Drawing Sheets

NEURAL NETWORK FILTERING TECHNIQUES FOR COMPENSATING LINEAR AND NON-LINEAR DISTORTION OF AN AUDIO TRANSDUCER

BACKGROUND OF THE INVENTION

1. Field of the Invention

This invention relates to audio transducer compensation, and more particularly to a method of compensating linear and non-linear distortion of an audio transducer such as a speaker, microphone or power amp and broadcast antenna.

2. Description of the Related Art

Audio speakers preferably exhibit a uniform and predictable input/output (I/O) response characteristic. Ideally, the analog audio signal coupled to the input of a speaker is what is provided at the ear of the listener. In reality, the audio signal that reaches the listener's ear is the original audio signal plus some distortion caused by the speaker itself (e.g., its construction and the interaction of the components within it) and by the listening environment (e.g., the location of the listener, the acoustic characteristics of the room, etc) in which the audio signal must travel to reach the listener's ear. There are many techniques performed during the manufacture of the speaker to minimize the distortion caused by the speaker itself so as to provide the desired speaker response. In addition, there are techniques for mechanically hand-tuning the speaker to further reduce distortion.

U.S. Pat. No. 6,766,025 to Levy describes a programmable speaker that uses characterization data stored in memory and digital signal processing (DSP) to digitally perform transform functions on input audio signals to compensate for speaker related distortion and listening environment distortion. In a manufacturing environment, a non-intrusive system and method for tuning the speaker is performed by applying a reference signal and a control signal to the input of the programmable speaker. A microphone detects an audible signal corresponding to the input reference signal at the output of the speaker and feeds it back to a tester which analyzes the frequency response of the speaker by comparing the input reference signal to the audible output signal from the speaker. Depending on the results of the comparison, the tester provides to the speaker an updated digital control signal with new characterization data which is then stored in the speaker memory and used to again perform transform functions on the input reference signal. The tuning feedback cycle continues until the input reference signal and the audible output signal from the speaker exhibit the desired frequency response as determined by the tester. In a consumer environment, a microphone is positioned within selected listening environments and the tuning device is again used to update the characterization data to compensate for distortion affects detected by the microphone within the selected listening environment. Levy relies on techniques for providing inverse transforms that are well known in the field of signal processing to compensate for speaker and listening environment distortion.

Distortion includes both linear and non-linear components. Non-linear distortion such as "clipping" is a function of the amplitude of the input audio signal whereas linear distortion is not. Known compensation techniques either address the linear part of the problem and ignore the non-linear component or vice-versa. Although linear distortion may be the dominant component, non-linear distortion creates additional spectral components which are not present in the input signal. As a result, the compensation is not precise and thus not suitable for certain high-end audio applications.

There are many approaches to solve the linear part of the problem. The simplest method is an equalizer that provides a bank of bandpass filters with independent gain control. More elaborate techniques include both phase and amplitude correction. For example, Norcross et al "Adaptive Strategies for Inverse Filtering" Audio Engineering Society Oct. 7-10, 2005 describes a frequency-domain inverse filtering approach that allows for weighting and regularization terms to bias an error at some frequencies. While the method is good in providing desirable frequency characteristics it has no control over the time-domain characteristics of the inverted response, e.g. the frequency-domain calculations can not reduce pre-echoes in the final (corrected and played back through speaker) signal.

Techniques for compensating non-linear distortion are less developed. Klippel et al, 'Loudspeaker Nonlinearities—Causes, Parameters, Symptoms' AES Oct. 7-10, 2005 describes the relationship between non-linear distortion measurement and nonlinearities which are the physical causes for signal distortion in speakers and other transducers. Bard et al "Compensation of nonlinearities of horn loudspeakers", AES Oct. 7-10, 2005 uses an inverse transform based on frequency-domain Volterra kernels to estimate the nonlinearity of the speaker. The inversion is obtained by analytically calculating the inverted Volterra kernels from forward frequency domain kernels. This approach is good for stationary signals (e.g. a set of sinusoids) but significant nonlinearity may occur in transient non-stationary regions of the audio signal.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides efficient, robust and precise filtering techniques for compensating linear and non-linear distortion of an audio transducer such as a speaker. These techniques include both a method of characterizing the audio transducer to compute the inverse transfer functions and a method of implementing those inverse transfer functions for reproduction. In a preferred embodiment, the inverse transfer functions are extracted using time domain calculations such as provided by linear and non-linear neural networks, which more accurately represent the properties of audio signals and the transducer than conventional frequency domain or modeling based approaches. Although the preferred approach is to compensate for both linear and non-linear distortion, the neural network filtering techniques may be applied independently. The same techniques may also be adapted to compensate for the distortion of the transducer and listening, recording or broadcast environment.

In an exemplary embodiment, a linear test signal is played through the audio transducer and synchronously recorded. The original and recorded test signals are processed to extract the forward linear transfer function and preferably to reduce noise using, for example, both time, frequency and time/frequency domain techniques. A parallel application of a Wavelet transform to 'snapshots' of the forward transform that exploits the transform's time-scaling properties is particularly well suited to the properties of the transducer impulse response. The inverse linear transfer function is calculated and mapped to the coefficients of a linear filter. In a preferred embodiment, a linear neural network is trained to invert the linear transfer function whereby the network weights are mapped directly to the filter coefficients. Both time and frequency domain constraints may be placed on the transfer function via the error function to address such issues as pre-echo and over-amplification.

A non-linear test signal is applied to the audio transducer and synchronously recorded. The recorded signal is preferably passed through the linear filter to remove the linear distortion of the device. Noise reduction techniques may also be applied to the recorded signal. The recorded signal is then subtracted from the non-linear test signal to provide an estimate of the non-linear distortion from which the forward and inverse non-linear transfer functions are computed. In a preferred embodiment, a non-linear neural network is trained on the test signal and non-linear distortion to estimate the forward non-linear transfer function. The inverse transform is found by recursively passing a test signal through the non-linear neural network and subtracting the weighted response from the test signal. The weighting coefficients of the recursive formula are optimized by, for example, a minimum mean-square-error approach. The time-domain representation used in this approach is well-suited to handle the nonlinearities in the transient regions of audio signals.

At reproduction, the audio signal is applied to a linear filter whose transfer function is an estimate of the inverse linear transfer function of the audio reproduction device to provide a linear precompensated audio signal. The linearly precompensated audio signal is then applied to a non-linear filter whose transfer function is an estimate of the inverse nonlinear transfer function. The non-linear filter is suitably implemented by recursively passing the audio signal through the trained non-linear neural network and an optimized recursive formula. To improve efficiency, the non-linear neural network and the recursive formula can be used as a model to train a single-pass playback neural network. For output transducers such as speakers or amplified broadcast antennas, the linearly and non-linearly precompensated signal is passed to the transducer. For input transducers such as a microphone, the linear and non-linear compensation is applied to the output of the transducer.

These and other features and advantages of the invention will be apparent to those skilled in the art from the following detailed description of preferred embodiments, taken together with the accompanying drawings, in which:

DETAILED DESCRIPTION OF THE INVENTION

The present invention provides efficient, robust and precise filtering techniques for compensating linear and non-linear distortion of an audio transducer such as a speaker, amplified broadcast antenna or perhaps a microphone. These techniques include both a method of characterizing the audio transducer to compute the inverse transfer functions and a method of implementing those inverse transfer functions for reproduction during playback, broadcast or recording. In a preferred embodiment, the inverse transfer functions are extracted using time domain calculations such as provided by linear and non-linear neural networks, which more accurately represent the properties of audio signals and the audio transducer than conventional frequency domain or modeling based approaches. Although the preferred approach is to compensate for both linear and non-linear distortion, the neural network filtering techniques may be applied independently. The same techniques may also be adapted to compensate for the distortion of the speaker and listening, broadcast or recording environment.

As used herein, the term "audio transducer" refers to any device that is actuated by power from one system and supplies power in another form to another system in which one form of the power is electrical and the other is acoustic or electrical, and which reproduces an audio signal. The transducer may be an output transducer such as a speaker or amplified antenna or an input transducer such as a microphone. An exemplary embodiment of the invention will be now be described for a loudspeaker that converts an electrical input audio signal into an audible acoustic signal.

Figure 1A:
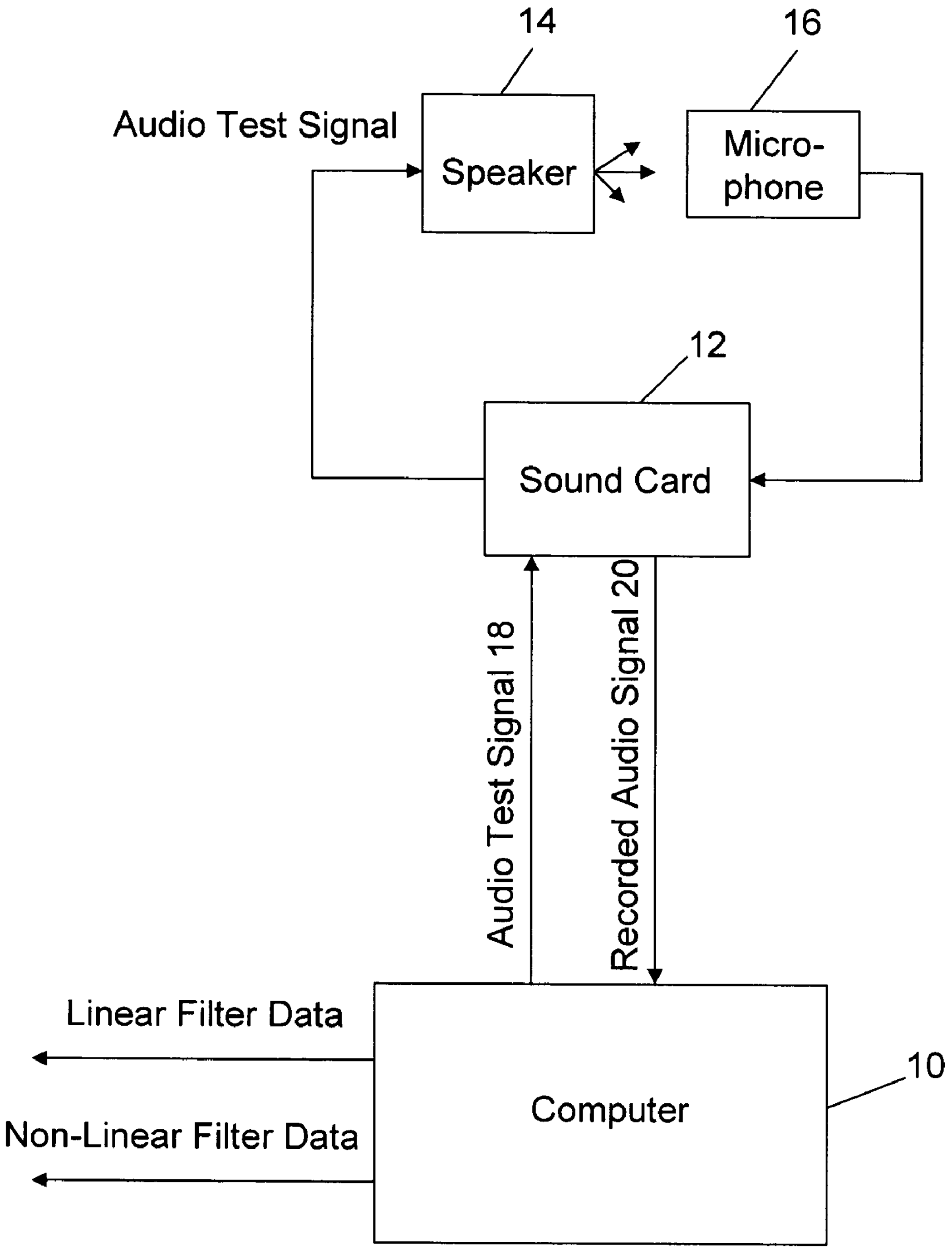
FIGS. 1*a* and 1*b* are block and flow diagrams for computing inverse linear and non-linear transfer functions for pre-compensating an audio signal for playback on an audio reproduction device.
Figure 1B:
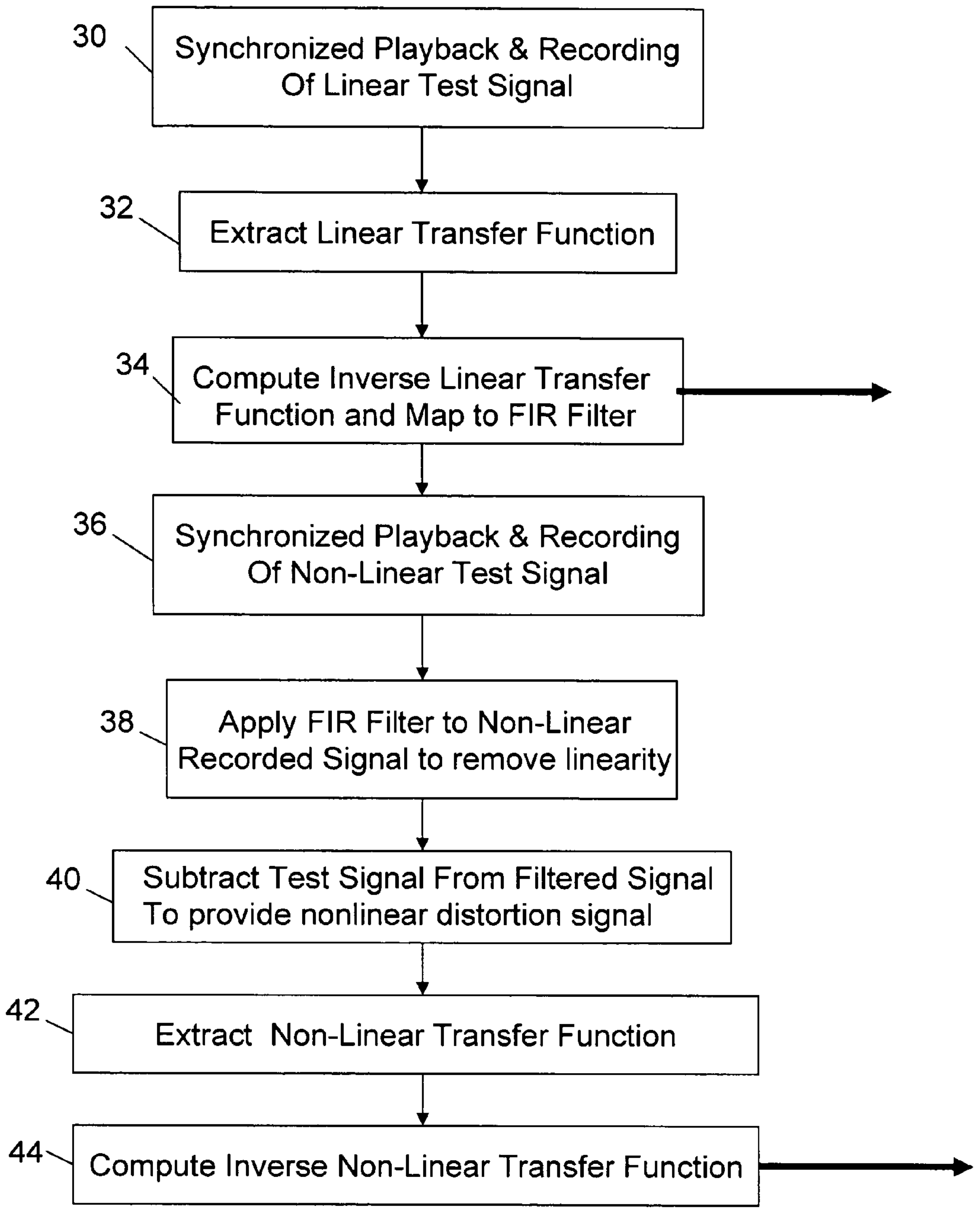
Figure 2:
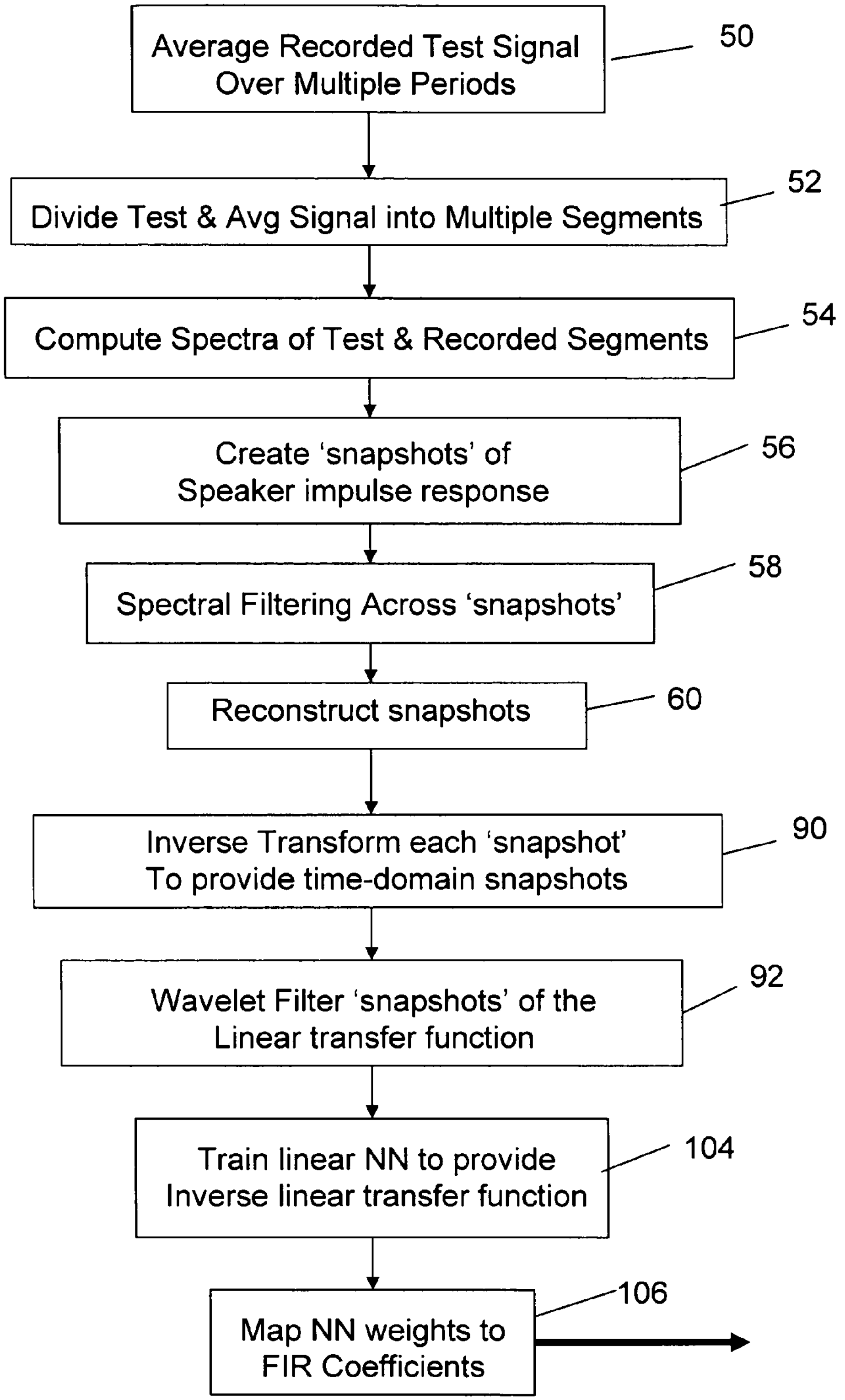
FIG. 2 is a flow diagram for extracting and noise reducing the forward linear transfer function and computing the inverse linear transfer function using a linear neural network.

The test set-up for characterizing the distortion properties of the speaker and the method of computing the inverse transfer functions are illustrated in FIGS. 1*a* and 1*b*. The test set-up suitably includes a computer 10, a sound card 12, the speaker under test 14 and a microphone 16. The computer generates and passes an audio test signal 18 to sound card 12, which in turn drives the speaker. Microphone 16 picks up the audible signal and converts it back to an electrical signal. The sound card passes the recorded audio signal 20 back to the computer for analysis. A fully-duplexed sound card is suitably used so that playback and recording of the test signal is performed with reference to a shared clock signal so that the signals are time-aligned to within a single sample period, and thus fully synchronized.

The techniques of the present invention will characterize and compensate for any sources of distortion in the signal path from playback to recording. Accordingly, a high quality microphone is used such that any distortion induced by the microphone is negligible. Note, if the transducer under test were a microphone, a high quality speaker would be used to negate unwanted sources of distortion. To characterize only the speaker, the "listening environment" should be configured to minimize any reflections or other sources of distortion. Alternately, the same techniques can be used to characterize the speaker in the consumer's home theater, for example. In the latter case, the consumer's receiver or speaker system would have to be configured to perform the test, analyze the data and configure the speaker for playback.

The same test set-up is used to characterize both the linear and non-linear distortion properties of the speaker. The computer generates different audio test signals 18 and performs a different analysis on the recorded audio signal 20. The spectral content of the linear test signal should cover the full analyzed frequency range and full range of amplitudes for the speaker. An exemplary test signal consists of two series of linear, full-frequency chirps: (a) 700 ms linear increase in frequency from 0 Hz to 24 kHz, 700 ms linear decrease in frequency down to 0 Hz, then repeat, and (b) 300 ms linear increase in frequency from 0 Hz to 24 kHz, 300 ms linear decrease in frequency down to 0 Hz, then repeat. Both kinds of chirps are present in the signal at the same time spanning the full duration of the signal. Chirps are modulated by amplitude in such a way to produce sharp attacks and slow decay in time domain. The length of each period of amplitude modulation is arbitrary and ranges approximately from 0 ms to 150 ms. The nonlinear test signal should preferably contain tones and noise of various amplitudes and periods of silence. There should be enough variability in the signal for the successful training of the neural network. An exemplary nonlinear test signal is constructed in a similar way but with different time parameters: (a) 4 sec linear increase in frequency from 0 Hz to 24 kHz, no decrease in frequency, next period of chirp starts again from 0 Hz, and (b) 250 ms linear increase in frequency from 0 Hz to 24 kHz, 250 ms linear decrease in frequency down to 0 Hz. Chirps in this signal are modulated by arbitrary amplitude change. The rate of amplitude can be as fast as 0 to full scale in 8 ms. Both linear and nonlinear test signals preferably contain some sort of marker which can be used for synchronization purposes (e.g. a single full-scale peak), but this is not mandatory.

As described in FIG. 1*b*, to extract the inverse transfer functions, the computer executes a synchronized playback and recording of a linear test signal (step 30). The computer processes both the test and recorded signals to extract the linear transfer function (step 32). The linear transfer function, also known as the "impulse response", characterizes the speaker's response to the application of a delta function or impulse. The computer computes the inverse linear transfer function and maps the coefficients to the coefficients of a linear filter such as a FIR filter (step 34). The inverse linear transfer function can be acquired in any number of ways but, as will be detailed below, the use of time domain calculations such as provided by a linear neural network most accurately represent the properties of audio signals and the speaker.

The computer executes a synchronized playback and recording of a non-linear test signal (step 36). This step can be performed after the linear transfer function is extracted or off-line at the same time as the linear test signal is recorded. In the preferred embodiment, the FIR filter is applied to the recorded signal to remove the linear distortion component (step 38). Although not always necessary, extensive testing has shown that the removal of the linear distortion greatly improves the characterization, hence inverse transfer function of the non-linear distortion. The computer subtracts the test signal from the filtered signal to provide an estimate of only the non-linear distortion component (step 40). The computer then processes the non-linear distortion signal to extract the non-linear transfer function (step 42) and to compute the inverse non-linear transfer function (step 44). Both transfer functions are preferably computed using time-domain calculations.

Our simulations and testing have demonstrated that the extraction of inverse transfer functions for both the linear and non-linear distortion components improves the characterization of the speaker and the distortion compensation thereof. Furthermore, the performance of the non-linear portion of the solution is greatly improved by removing the typically dominant linear distortion prior to characterization. Lastly, the use of time-domain calculations to compute the inverse transfer functions also improves performance.

Linear Distortion Characterization

An exemplary embodiment for extracting the forward and inverse linear transfer functions is illustrated in FIGS. 2 through 6. The first part of the problem is to provide a good estimate of the forward linear transfer function. This could be achieved in many ways including simply applying an impulse to the speaker and measuring the response or taking the inverse transform of the ratio of the recorded and test signal spectra. However, we have found that modifying the latter approach with a combination of time, frequency, and/or time/frequency noise reduction techniques provides a much cleaner forward linear transfer function. In the exemplary embodiment, all three noise reduction techniques are employed but any one or two of them may be used for a given application.

The computer averages multiple periods of the recorded test signal to reduce noise from random sources (step 50). The computer then divides the period of the test and recorded signal into as many segments M as possible subject to the constraint that each segment must exceed the duration of the speaker's impulse response (step 52). If this constraint is not met, then parts of the speaker's impulse response will overlap and it will be impossible to separate them. The computer computes the spectra of the test and recorded segments by, for example, performing an FFT (step 54) and then forms a ratio of the recorded spectra to the corresponding test spectra to form M 'snapshots' in the frequency domain of the speaker impulse response (step 56). The computer filters each spectral line across the M snapshots to select subsets of N<M snapshots all having similar amplitude response for that spectral line (step 58). This "Best-N Averaging" is based on our knowledge that in typical audio signals in noisy environments there are usually a set of snapshots where correspondent spectral lines are almost unaffected by 'tonal' noise. Consequently this process actually avoids noise instead of just reducing it. In an exemplary embodiment, the Best-N Averaging algorithm is (for each spectral line):

1. Calculate the average for the spectral line over the available snapshots.
2. If there are only N snapshots—stop.
3. If there are >N snapshots—find the snapshot where the value of the spectral line is farthest from the calculated average and remove the snapshot from further calculations.
4. Continue from step 1.

The output of the process for each spectral line is the subset of N 'snapshots' with the best spectral line values. The computer then maps the spectral lines from the snapshots enumerated in each subset to reconstruct N snapshots (step 60).

Figures 3A, 3B:
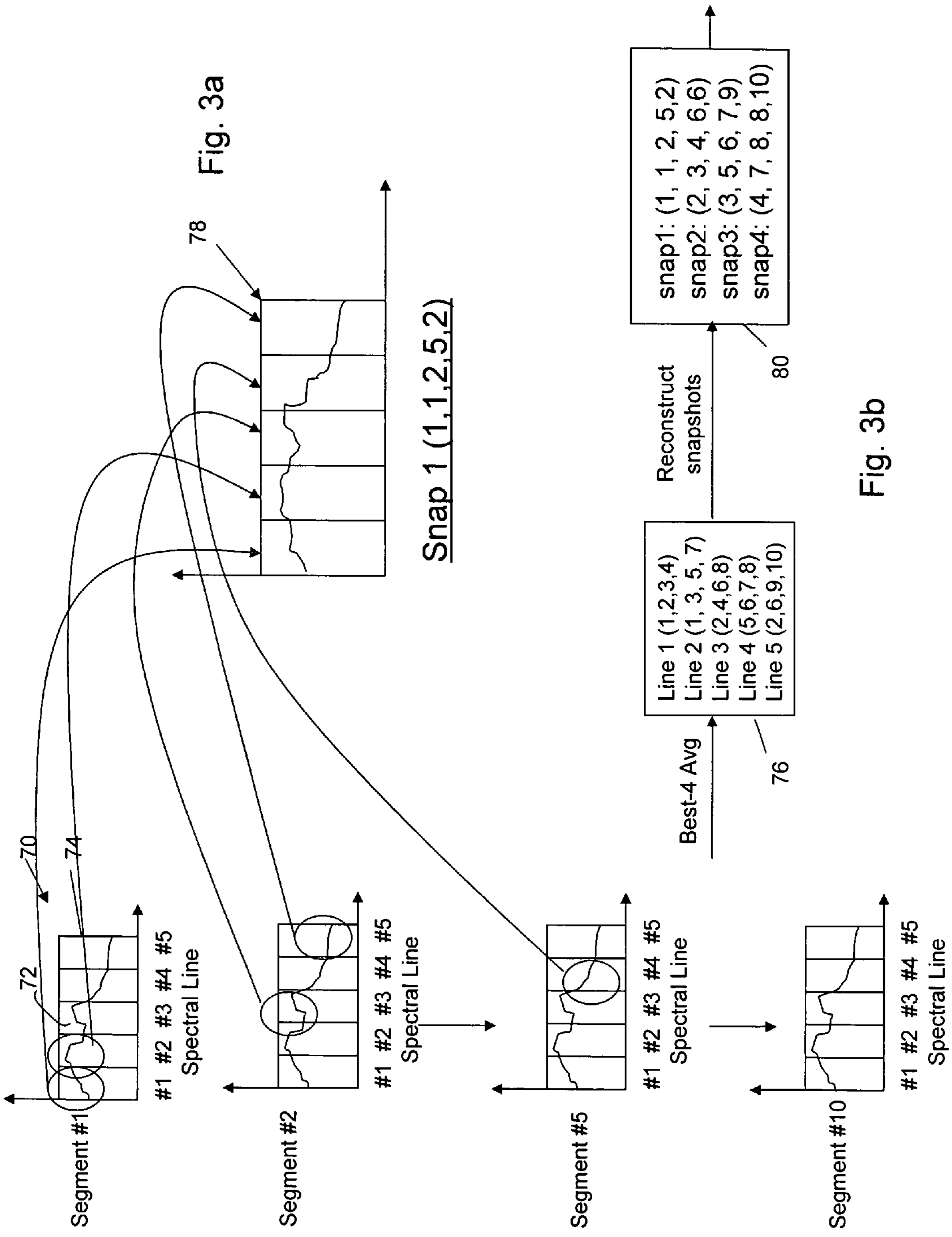
FIGS. 3*a* and 3*b* are a diagram illustrating the frequency-domain filtering and reconstruction of the snapshots and FIG. 3*c* is a frequency plot of the resulting forward linear transfer function.

A simple example is provided in FIGS. 3*a* and 3*b* to illustrate the steps of Best-N Averaging and snapshot reconstruction. On the left side of the figure are 10 'snapshots' 70 corresponding to the M=10 segments. In this example, the spectrum 72 of each snapshot is represented by 5 spectral lines 74 and N=4 for the averaging algorithm. The output of the Best-4 Averaging is a subset of snapshots for each line (Line1, Line 2, . . . Line 5) (step 76). The first snap shot 'snap1' 78 is reconstructed by appending the spectral lines for the snapshots that are the first entries in each of Line1, Line 2, . . . Line 5. The second snap shot "snap2" is reconstructed by appending the spectral lines for the snapshots that are the second entries in each line and so forth (step 80).

This process can be represented algorithmically as follows:

S(i,j)=FFT(Recorded Segment (i,j))/FFT(Test Segment (i,j)) where S( ) is a snapshot 70 and I=1–M segments and j=1–P spectral lines;

Line(j,k)=F(S(i,j)) where F( ) is the Best-4 Avg algorithm and k=1 to N; and

RS(k,j)=Line(j,k) where RS( ) is the reconstructed snapshot.

Figure 3C:
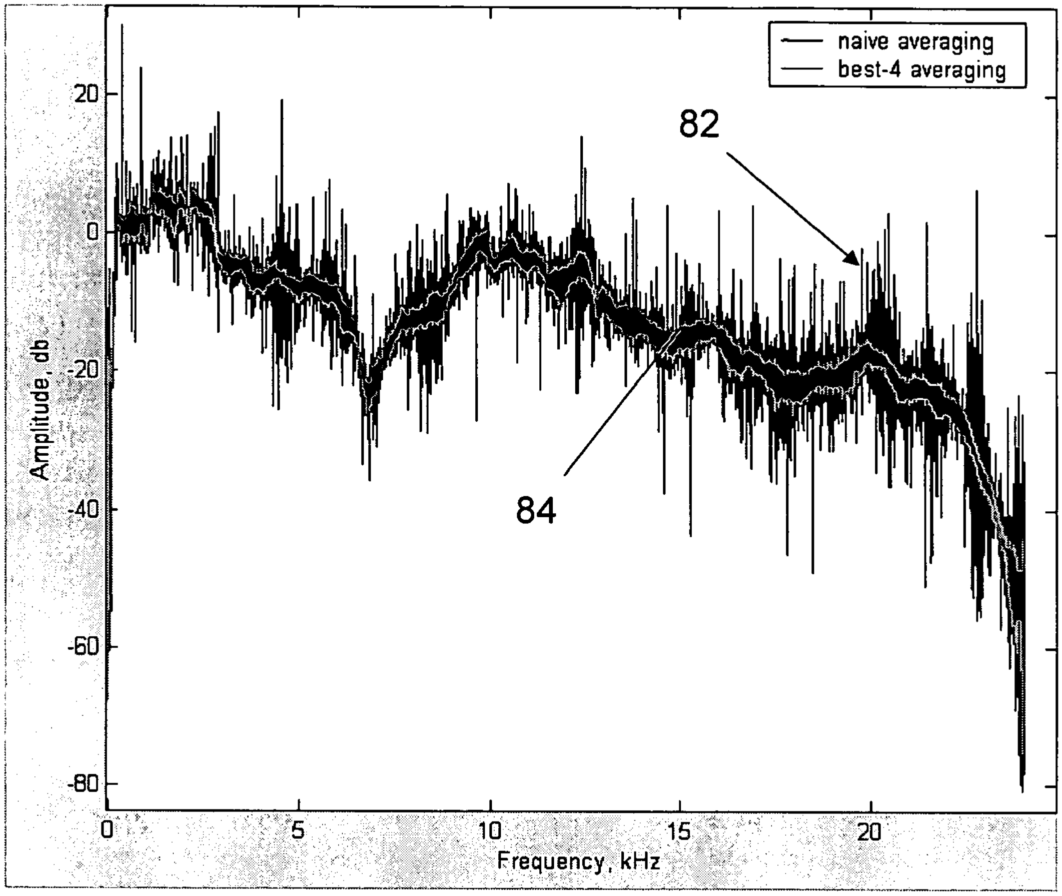
Figure 4A:
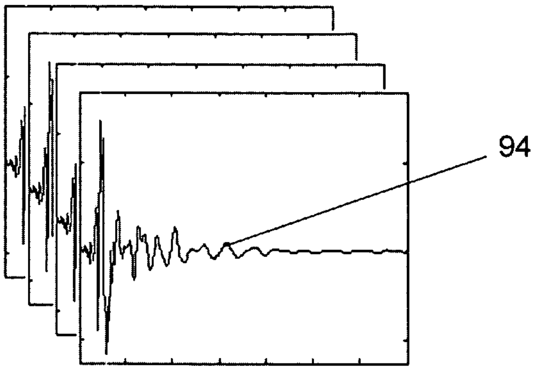
FIGS. 4*a*-4*d* are diagrams illustrating the parallel application of a Wavelet transform to snapshots of the forward linear transfer function.
Figure 4D:
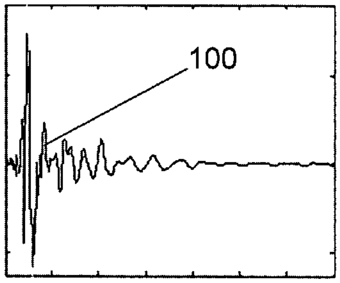
Figure 4B:
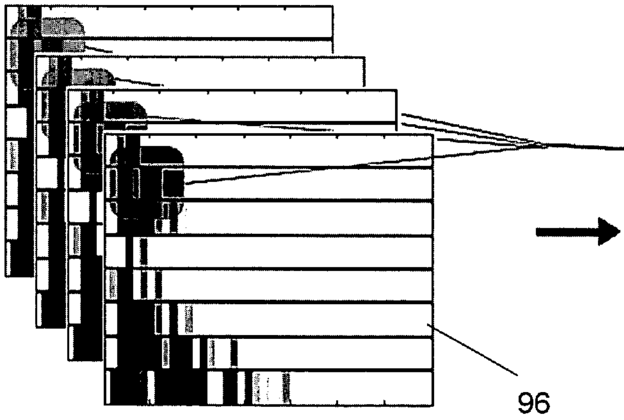
Figure 4C:
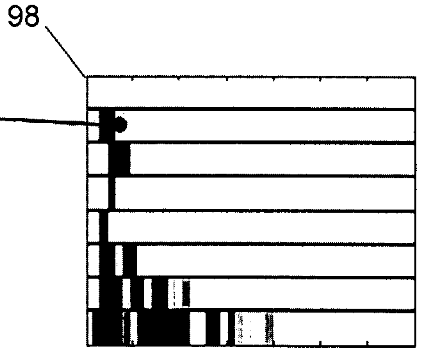

The results of a Best-4 Averaging are shown in FIG. 3*c*. As shown, the spectrum 82 produced from a simple averaging of all snapshots for each spectral line is very noisy. The 'tonal' noise is very strong in some of the snapshots. By comparison, the spectrum 84 produced by the Best-4 Averaging has very little noise. It is important to note that this smooth frequency response is not the result of simply averaging more snapshots, which would obfuscate the underlying transfer function and be counter productive. Rather the smooth frequency response is a result of intelligently avoiding the sources of noise in the frequency domain, thus reducing the noise level while preserving the underlying information.

The computer performs an inverse FFT on each of the N frequency-domain snapshots to provide N time-domain snapshots (step 90). At this point, the N time-domain snapshots could be simply averaged together to output the forward linear transfer function. However, in the exemplary embodiment, an additional Wavelet filtering process (step 92) is performed on the N snapshots to remove noise that can be 'localized' in the multiple time-scales in the time/frequency representation of the Wavelet transform. Wavelet Filtering also results in a minimal amount of 'ringing' in the filtered result.

One approach is to perform a single Wavelet transform on the averaged time-domain snapshot, pass the 'approximation' coefficients and threshold the 'detail' coefficients to zero for a predetermined energy level, and then inverse transform to extract the forward linear transfer function. This approach does remove the noise commonly found in the 'detail' coefficients at the different decomposition levels of the Wavelet transform.

A better approach as shown in FIGS. 4*a*-4*d* is to use each of the N snapshots 94 and implement a 'parallel' Wavelet transform that forms a 2D coefficient map 96 for each snapshot and utilizes statistics of each transformed snapshot coefficient to determine which coefficients are set to zero in the output map 98. If a coefficient is relatively uniform across the N snapshots then the noise level is probably low and that coefficient should be averaged and passed. Conversely, if the variance or deviation of the coefficients is significant that is a good indicator of noise. Therefore, one approach is to compare a measure of the deviation against a threshold. If the deviation exceeds the threshold then that coefficient is set to zero. This basic principle can be applied for all coefficients in which case some 'detail' coefficients that would have been assumed to be noisy and set to zero may be retained and some 'approximation' coefficients that would have been otherwise passed are set to zero thereby reducing the noise in the final forward linear transfer function 100. Alternately, all of the 'detail' coefficients can be set to zero and the statistics used to catch noisy approximation coefficients. In another embodiment, the statistic could be a measure of the variation of a neighborhood around each coefficient.

Figure 5A:
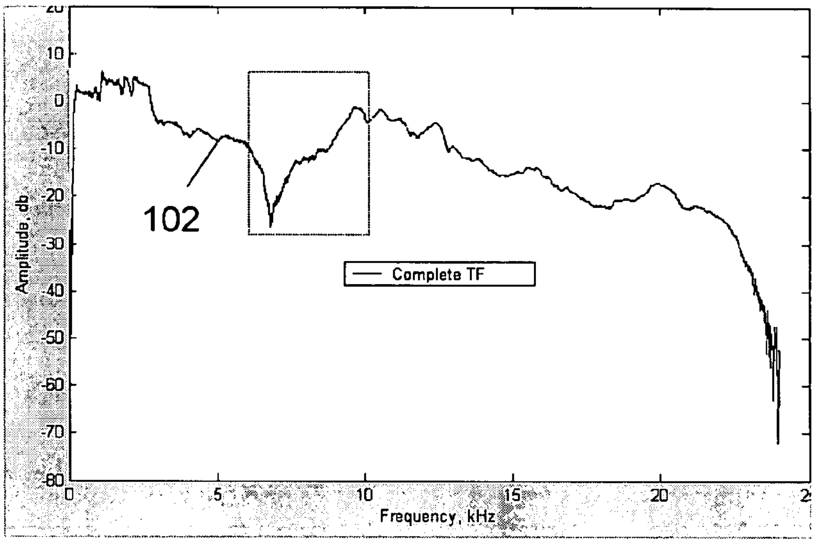
FIGS. 5*a* and 5*b* are plots of the noise reduced forward linear transfer function.
Figure 5B:
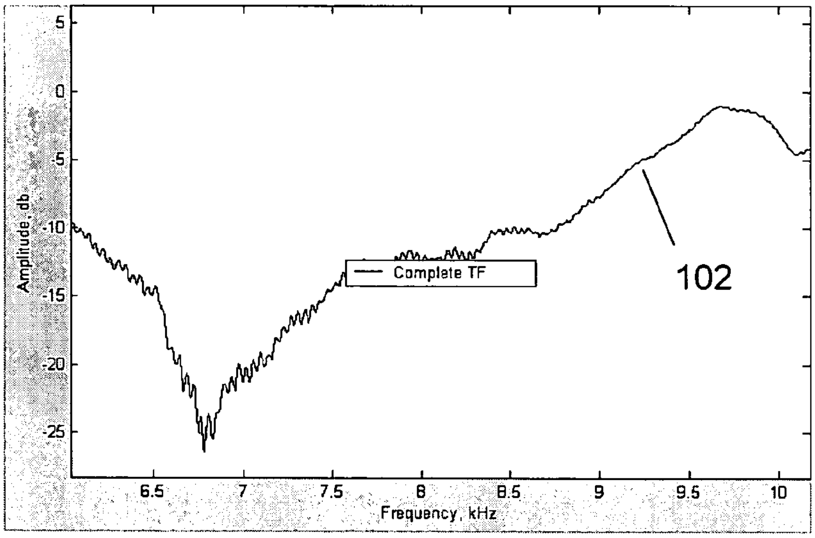

The effectiveness of the noise reduction techniques is illustrated in FIGS. 5*a* and 5*b*, which show the frequency response 102 of the final forward linear transfer function 100 for a typical speaker. As shown, the frequency response is highly detailed and clean.

To preserve the accuracy of the forward linear transfer function, we need a method of inverting the transfer function to synthesize the FIR filter that can flexibly adapt to the time and frequency domain properties of the speaker and its impulse response. To accomplish this we selected a Neural Network. The use of a linear activation function constrains the selection of the Neural Network architectures to be linear. The weights of the linear neural network are trained using the forward linear transfer function 100 as the input and a target impulse signal as the target to provide an estimate of the speaker's inverse linear transfer function A( ) (step 104). The error function can be constrained to provide either desired time-domain constraints or frequency-domain characteristics. Once trained, the weights from the nodes are mapped to the coefficients of the linear FIR filter (step 106).

Many known types of neural networks are suitable. The current state of art in neural network architectures and training algorithms makes a feedforward network (a layered network in which each layer only receives inputs from previous layers) a good candidate. Existing training algorithms provide stable results and a good generalization.

Figure 6:
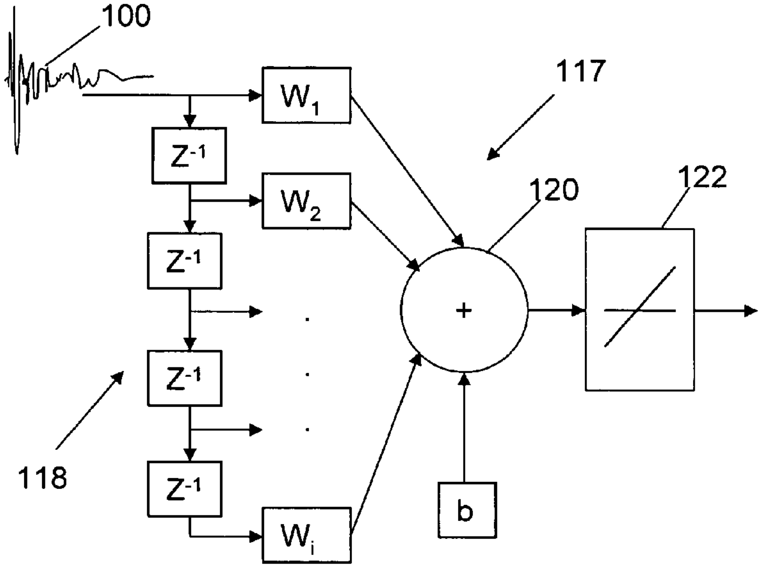
FIG. 6 is a diagram of a single-layer single-neuron neural network to invert the forward linear transform.

As shown in FIG. 6, a single-layer single-neuron neural network 117 is sufficient to determine the inverse linear transfer function. The time-domain forward linear transfer function 100 is applied to the neuron through a delay line 118. The layer will have N delay elements in order to synthesize an FIR filter with N taps. Each neuron 120 computes a weighted sum of the delay elements, which simply pass the delayed input through. The activation function 122 is linear so the weighted sum is passed as the output of the neural network. In an exemplary embodiment, a 1024-1 feedforward network architecture (1024 delay elements and 1 neuron) performed well for a 512-point time-domain forward transfer function and a 1024-tap FIR filter. More sophisticated networks including one or more hidden layers could be used. This may add some flexibility but will require modifications to the training algorithm and back-propagation of the weights from the hidden layer(s) to the input layer in order to map the weights to the FIR coefficients.

An offline supervised resilient back propagation training algorithm tunes the weights with which the time-domain forward linear transfer function is passed to the neuron. In supervised learning, to measure neural network performance in training process, the output of the neuron is compared to a target value. To invert the forward transfer function, the target sequence contains a single "impulse" where all the target values $T_i$ are zero except one which is set to 1 (unity gain). Comparison is performed by the means of mathematical metric such as mean square error (MSE). The standard MSE formula is:

$$MSE = \frac{\sum_{i=1}^{N} (T_i - O_i)^2}{N},$$

where N is the number of output neurons, $O_i$ are the neuron output values and $T_i$ are the sequence of target values. The training algorithm "back propagates" the errors through the network to adjust all of weights. The process is repeated until the MSE is minimized and the weights have converged to a solution. These weights are then mapped to the FIR filter.

Because the neural network performs a time-domain calculation, i.e. the output and target values are in the time domain, time-domain constraints can be applied to the error function to improve the properties of the inverse transfer function. For example, pre-echo is a psychoacoustic phenomenon where an unusually noticeable artifact is heard in a sound recording from the energy of time domain transients smeared backwards in time. By controlling it's duration and amplitude we can lower it's audibility, or make it completely inaudible due to existence of 'forward temporal masking'.

One way to compensate for pre-echo is weight the error function as a function of time. For example, a constrained MSE is given by $$MSE_w = \frac{\sum_{i=1}^{N} D_i(T_i - O_i)^2}{N}.$$

We can assume that times t<0 correspond to pre-echoes and the error at t<0 should be weighted more heavily. For example, D(−inf:−1)=100 and D(0:inf)=1. The back propagation algorithm will then optimize the neuron weights $W_i$ to minimize this weighted MSEw function. The weights may be tuned to follow temporal masking curves, and there are other methods to impose constraints on error measure function besides individual errors weighting (e.g. constraining the combined error over a selected range).

An alternate example of constraining the combined error over a selected range A:B is given:

$$SSE_{AB} = \sum_{i=A}^{B} (T_i - O_i)^2$$

$$Err = \begin{cases} 0, & SSE_{AB} < \text{Lim} \\ 1, & SSE_{AB} > \text{Lim} \end{cases}$$

Where:

$SSE_{AB}$—Sum squared error over some range A:B;

$O_i$—network output values;

$T_i$—target values;

Lim—some predefined limit;

Err—final error (or metric) value.

Although the neural network is a time-domain calculation, a frequency-domain constraint can be placed on the network to ensure desirable frequency characteristics. For example, "over-amplification" can occur in the inverse transfer function at frequencies where the speaker response has deep notches. Over-amplification will cause ringing in the time-domain response. To prevent over-amplification the frequency envelope of the target impulse, which is originally equal to 1 for all frequencies, is attenuated at the frequencies where original speaker response has deep notches so that the maximum amplitude difference between the original and target is below some db limit. The constrained MSE is given by:

$$MSE = \frac{\sum_{i=1}^{N} (T'_i - O_i)^2}{N}$$

$$T' = F^{-1}[A_f \cdot F(T)]$$

Where:

T'—constrained target vector;

T—original target vector;

O—network output vector;

F( )—denotes Fourier transform;

$F^{-1}$( )—denotes inverse Fourier transform;

$A_f$—target attenuation coefficients;

N—number of samples in target vector.

This will avoid over-amplification and the consequent ringing in time domain.

Alternately, the contributions of errors to the error function can be spectrally weighted. One way to impose such constraints is to compute the individual errors, perform an FFT on those individual errors and then compare the result to zero using some metric e.g. placing more weight on high-frequency components. For example a constrained error function is given by:

$$Err = \sum_{f=0}^{N} S_f \cdot F(T - O)^2$$

Where:

$S_f$—Spectral weights;

O—Network output vector;

T—Original target vector;

F( )—Denotes Fourier transform;

Err—Final error (or metric) value;

N—Number of spectral lines.

The time and frequency domain constraints may be applied simultaneously either by modifying the error function to incorporate both constraints or by simply adding the error functions together and minimizing the total.

The combination of the noise-reduction techniques for extracting the forward linear transfer function and the time-domain linear neural network that supports both time and frequency domain constraints provides a robust and accurate technique for synthesizing the FIR filter to perform the inverse linear transfer function to precompensate for the linear distortion of the speaker during playback.

Non-Linear Distortion Characterization

Figure 7:
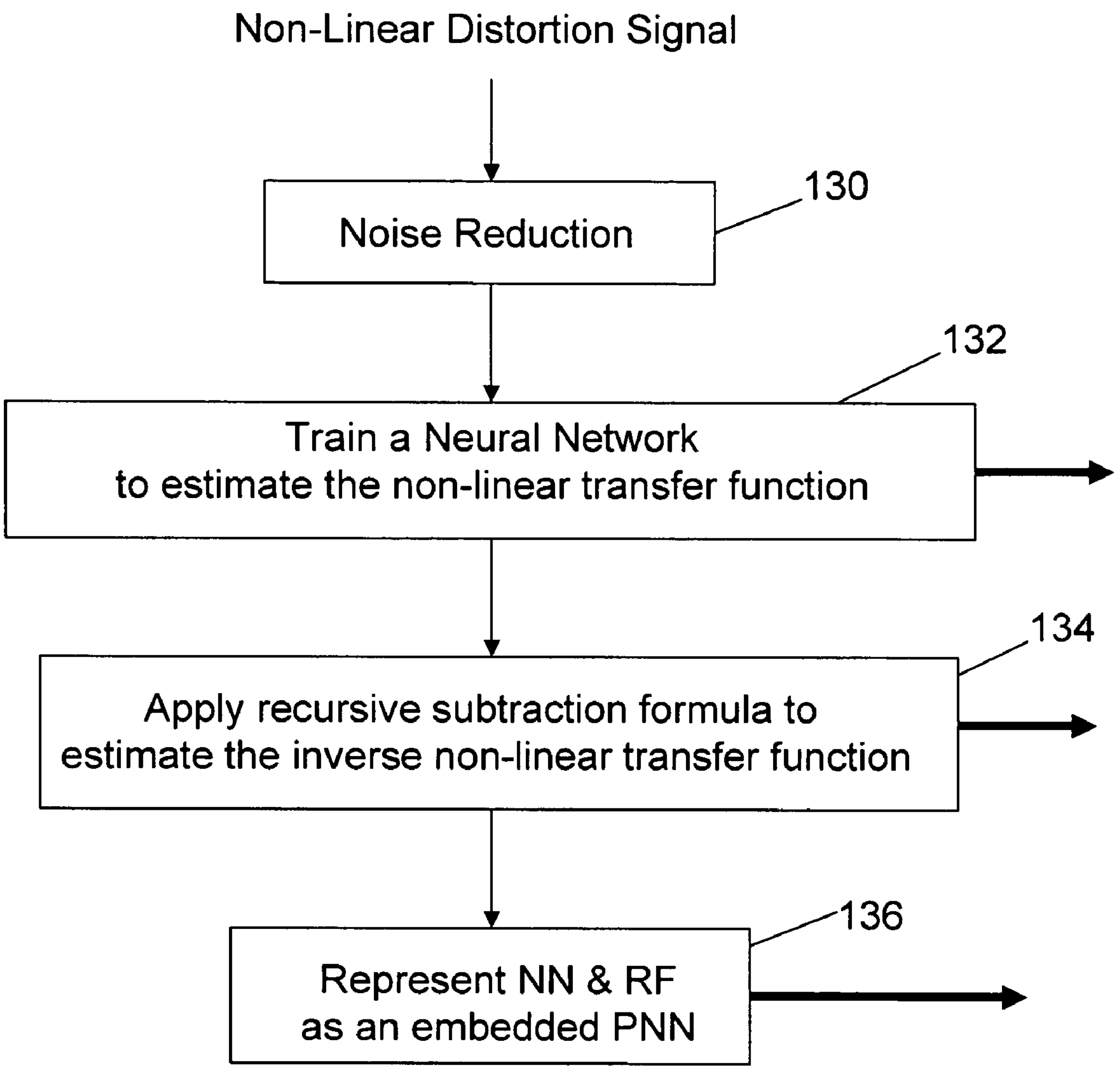
FIG. 7 is a flow diagram for extracting the forward non-linear transfer function using a non-linear neural network and computing the inverse non-linear transfer function using a recursive subtraction formula.

An exemplary embodiment for extracting the forward and inverse non-linear transfer functions is illustrated in FIG. 7. As described above the FIR filter is preferably applied to the recorded non-linear test signal to effectively remove the linear distortion component. Although this is not strictly necessary we have found that it significantly improves the performance of the inverse non-linear filtering. Conventional noise reduction techniques (step 130) may be applied to reduce random and other sources of noise but is often unnecessary.

Figure 8:
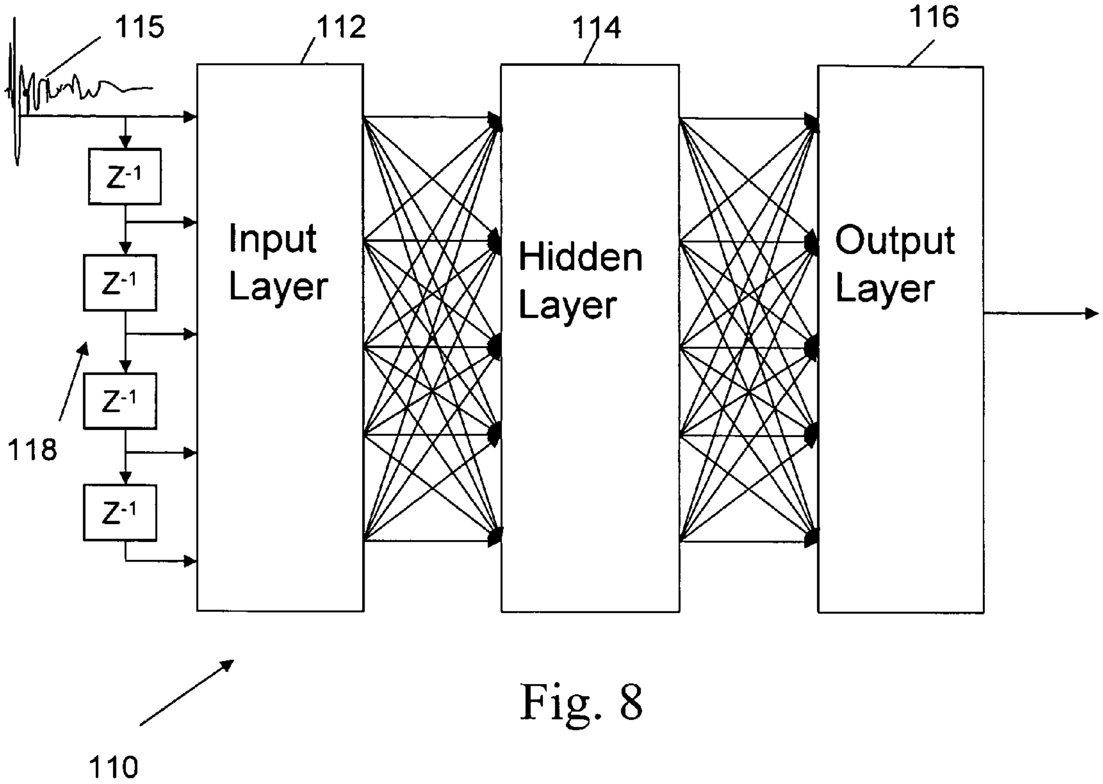
FIG. 8 is a diagram of a non-linear neural network.

To address the non-linear portion of the problem, we use a neural network to estimate the non-linear forward transfer function (step 132). As shown in FIG. 8, a feedforward network 110 generally includes an input layer 112, one or more hidden layers 114, and an output layer 116. The activation function is suitably a standard non-linear tanh( ) function. The weights of the non-linear neural network are trained using the original non-linear test signal I 115 as the input to delay line 118 and the non-linear distortion signal as the target in the output layer to provide an estimate of the forward non-linear transfer function F( ). Time and/or frequency-domain constraints can also be applied to the error function as required by a particular type of transducer. In an exemplary embodiment a 64-16-1 feed forward network was trained on 8 seconds of test signals. The time-domain neural network computation does a very good job representing the significant nonlinearities that may occur in transient regions of an audio signal, much better than frequency-domain Volterra kernels.

To invert the non-linear transfer function, we use a formula that recursively applies the forward non-linear transfer function F( ) to the test signal I using the non-linear neural network and subtracts a $1^{st}$ order approximation Cj*F(I), where Cj is a weighting coefficient for the jth recursive iteration, from the test signal I to estimate an inverse non-linear transfer function RF( ) for the speaker (step 134). The weighting coefficients Cj are optimized using, for example, a conventional least-squares minimization algorithm.

For a single iteration (no recursion), the formula for the inverse transfer function is simply Y=I−C1*F(I). In other words, passing an input audio signal I, in which the linear distortion has been suitably removed, through the forward transform F( ) and subtracting that from the audio signal I produces a signal Y that has been "precompensated" for the non-linear distortion of the speaker. When audio signal Y is passed through the speaker, the effects cancel. Unfortunately the effects do not exactly cancel and there typically remains a nonlinear residual signal. By iterating recursively two or more times, and thus having more weighting coefficients Ci to optimize, the formula can drive the nonlinear residual closer and closer to zero. Just two or three iterations have been shown to improve performance.

For example, a three iteration formula is given by:

$$Y=I-C3*F(I-C2*F(I-C1*F(I))).$$

Assuming that I has been precompensated for linear distortion, the actual speaker output is Y+F(Y). To effectively remove non-linear distortion we solve Y+F(Y)−I=0 and solve for coefficients C1, C2 and C3.

For playback there are two options. The weights of the trained neural network and the weighting coefficients Ci of recursive formula can be provided to the speaker or receiver to simply replicate the non-linear neural network and recursive formula. A computationally more efficient approach is to use the trained neural network and the recursive formula to train a "playback neural network" (PNN) that directly computes the inverse non-linear transfer function (step 136). The PNN is suitably also a feedforward network and may have the same architecture (e.g. layers and neurons) as the original network. The PNN can be trained using the same input signal that was used to train the original network and the output of the recursive formula as the target. Alternately, a different input signal can be passed through the network and recursive formula and that input signal and the resulting output used to train the PNN. The distinct advantage is that the inverse transfer function can be performed in a single pass through a neural network instead of requiring multiple (e.g. 3) passes through the network.

Distortion Compensation and Reproduction

In order to compensate for the speaker's linear and non-linear distortion characteristics, the inverse linear and non-linear transfer functions must actually be applied to the audio signal prior to its playback through the speaker. This can be accomplished in a number of different hardware configurations and different applications of the inverse transfer functions, two of which are illustrated in FIGS. 9*a*-9*b* and 10*a*-10*b*.

Figure 9A:
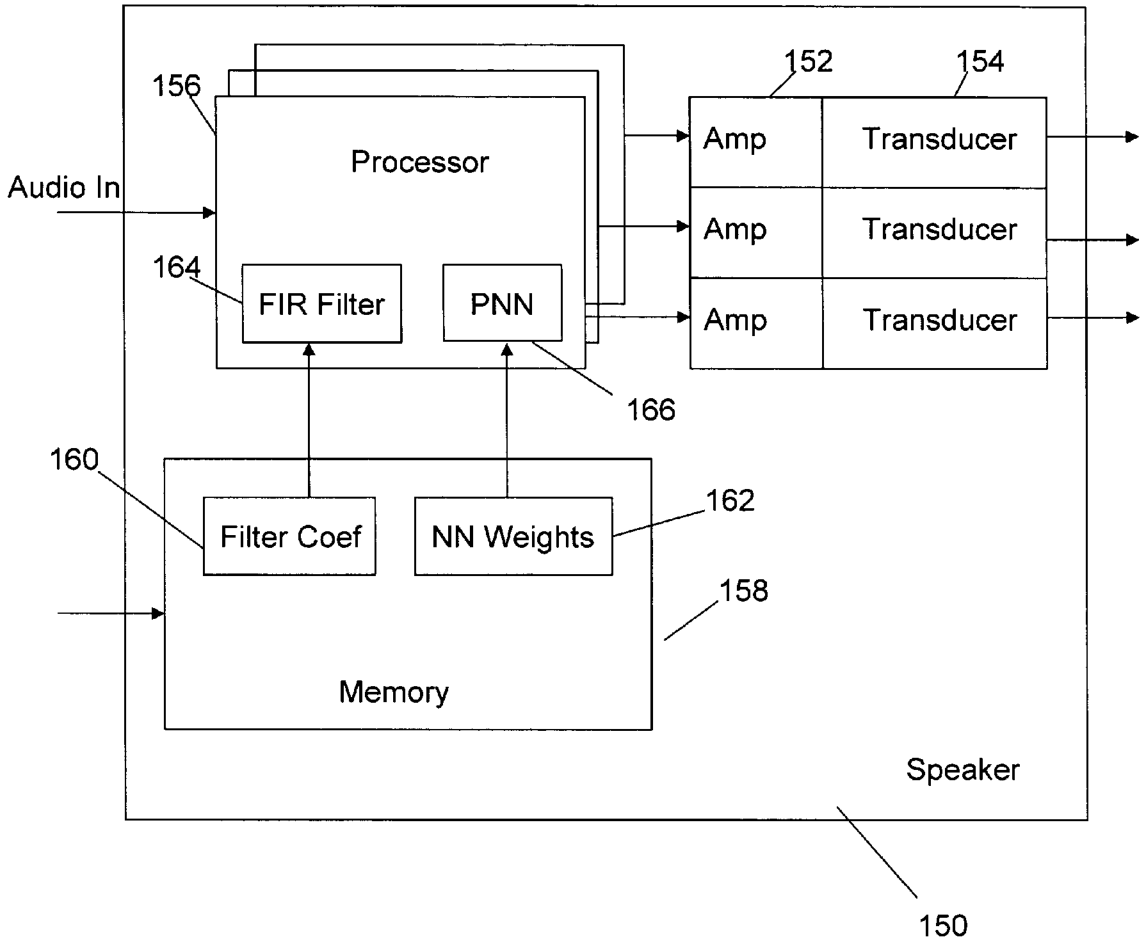
FIGS. 9*a* and 9*b* are block diagrams of an audio system configured to compensate linear and non-linear distortion of the speaker.
Figure 10B:
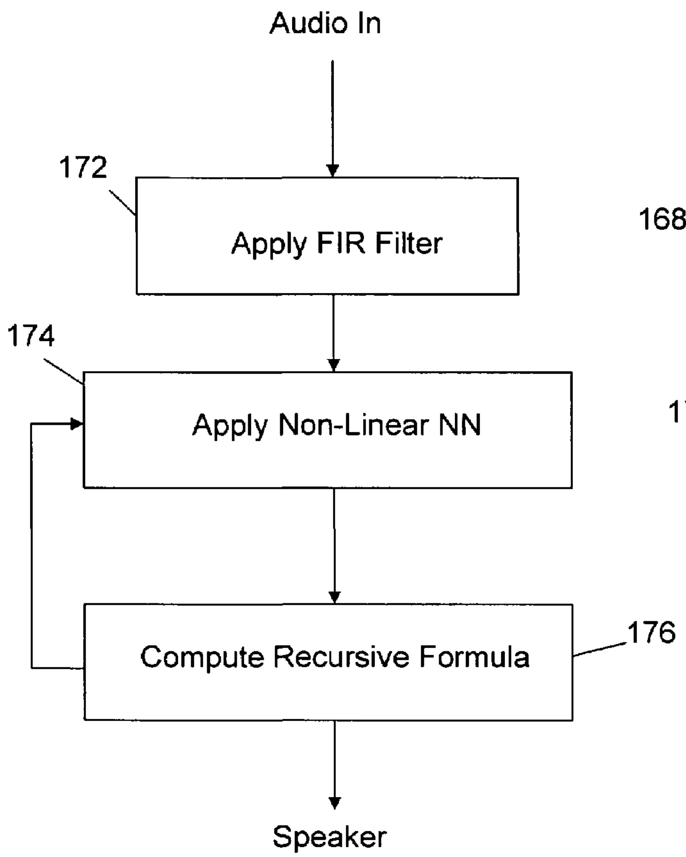
FIGS. 10*a* and 10*b* are flow diagrams for compensating an audio signal for linear and non-linear distortion during playback.
Figure 10A:
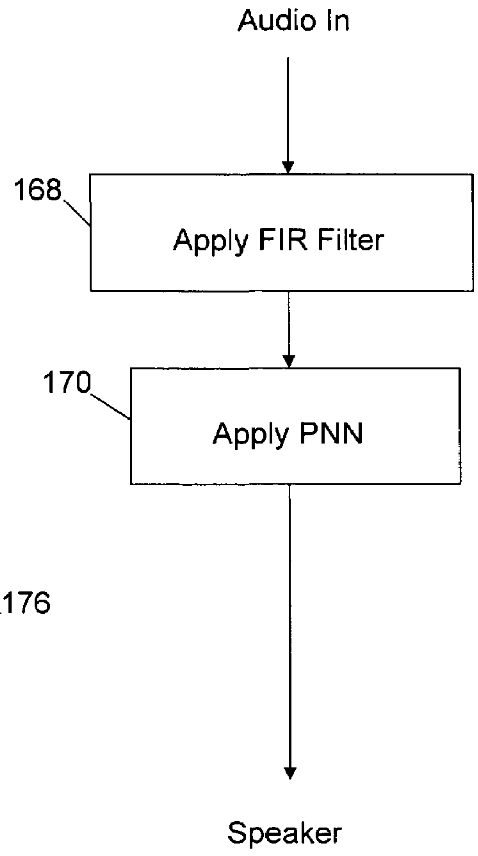

As shown in FIG. 9*a*, a speaker 150 having three amplifier 152 and transducer 154 assemblies for bass, mid-range and high frequencies is also provided with the processing capability 156 and memory 158 to precompensate the input audio signal to cancel out or at least reduce speaker distortion. In a standard speaker, the audio signal is applied to a cross-over network that maps the audio signal to the bass, mid-range and high-frequency output transducers. In this exemplary embodiment, each of the bass, mid-range and high-frequency components of the speaker were individually characterized for their linear and non-linear distortion properties. The filter coefficients 160 and neural network weights 162 are stored in memory 158 for each speaker component. These coefficients and weights can be stored in memory at the time of manufacture, as a service performed to characterize the particular speaker, or by the end-user by downloading them from a website and porting them into the memory. Processor(s) 156 load the filter coefficients into a FIR filter 164 and load the weights into a playback neural network (PNN) 166. As shown in FIG. 10*a*, the processor applies the FIR filter to the audio X in to precompensate it for linear distortion (step 168) and then applies that signal X' to the PNN to precompensate it for non-linear distortion (step 170) by passing X' through a non-linear playback neural network whose transfer function is the estimate of the inverse nonlinear transfer function RF( ) to generate precompensated audio signal Y=RF(X'), the neural network being trained to emulate the recursive subtraction of Cj*F(I) from audio signal X' where F( ) is a forward nonlinear transfer function of the transducer and Cj is a weighting coefficient for the jth recursive iteration. Alternately, network weights and recursive formula coefficients can be stored and loaded into the processor. As shown in FIG. 10*b*, the processor applies the FIR filter to the audio in X to precompensate it for linear distortion (step 172) and then applies that signal X' to the NN (step 174) and the recursive formula (step 176) to precompensate it for non-linear distortion by applying X' as an input to a neural network whose transfer function F( ) is a representation of the forward non-linear transfer function of the transducer to output an estimate F(X') of the non-linear distortion created by the transducer and recursively subtracting a weighted non-linear distortion Cj*F(X') from audio signal X' where Cj is a weighting coefficient for the jth recursive iteration to generate the precompensated audio signal Y=RF(X').

As mentioned previously, although the preferred approach is to compensate for both linear and non-linear distortion, the neural network filtering techniques may be applied independently. A method of compensating an audio signal I for an audio transducer comprises providing the audio signal I as an input to a neural network whose transfer function F( ) is a representation of the forward non-linear transfer function of the transducer to output an estimate F(I) of the nonlinear distortion created by the transducer for audio signal I, recursively subtracting a weighted non-linear distortion Cj*F(I) from audio signal I where Cj is a weighting coefficient for the jth recursive iteration to generate a compensated audio signal Y and directing the compensated audio signal Y to the transducer. A method of compensating an audio signal I for an audio transducer comprises passing the audio signal I through a non-linear playback neural network whose transfer function RF( ) is an estimate of an inverse nonlinear transfer function of the transducer to generate a precompensation audio signal Y and directing precompensation audio signal Y to the audio transducer, said neural network being trained to emulate the recursive subtraction of Cj*F(I) from audio signal X' where F( ) is a forward non-linear transfer function of the transducer and Cj is a weighting coefficient for the jth recursive iteration.

Figure 9B:
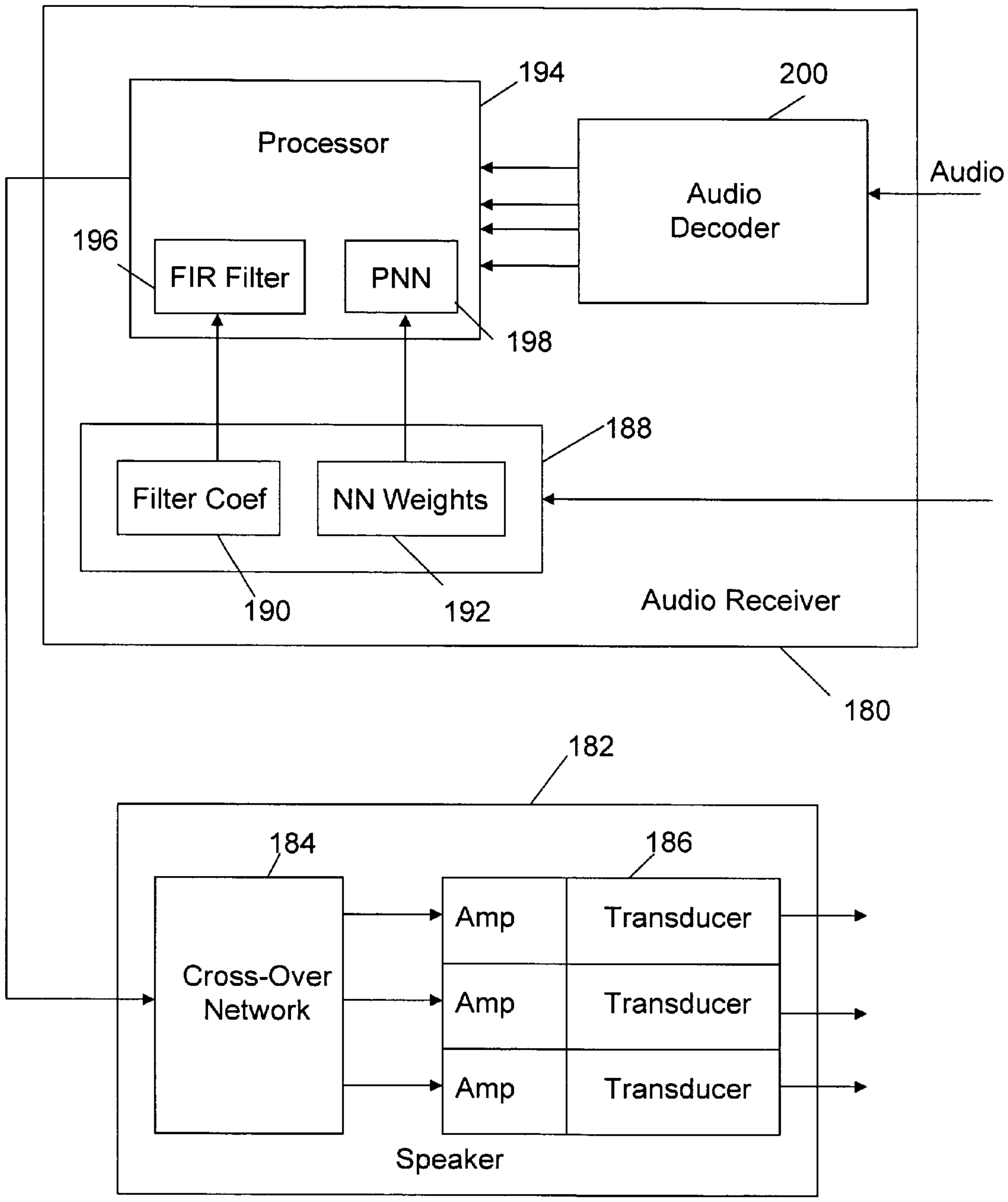

As shown in FIG. 9*b*, an audio receiver 180 can be configured to perform the precompensation for a conventional speaker 182 having a cross-over network 184 and amp/transducer components 186 for bass, mid-range and high frequencies. Although the memory 188 for storing the filter coefficients 190 and network weights 192 and the processor 194 for implementing the FIR filter 196 and PNN 198 are shown as separate or additional components for the audio decoder 200 it is quite feasible that this functionality would be designed into the audio decoder. The audio decoder receives the encoded audio signal from a TV broadcast or DVD, decodes it and separates into stereo (L,R) or multi-channel (L, R, C, Ls, Rs, LFE) channels which are directed to respective speakers. As shown, for each channel the processor applies the FIR filter and PNN to the audio signal and directs the precompensated signal to the respective speaker 182.

As mentioned earlier, the speaker itself or the audio receiver may be provided with a microphone input and the processing and algorithmic capability to characterize the speaker and train the neural networks to provide the coefficients and weights required for playback. This would provide the advantage of compensating for the linear and non-linear distortion of the particular listening environment of each individual speaker in addition to the distortion properties of that speaker.

Precompensation using the inverse transfer functions will work for any output audio transducer such as the described speaker or an amplified antenna. However, in the case of any input transducer such as a microphone any compensation must be performed "post" transducing from an audible signal into an electrical signal, for example. The analysis for training the neural networks etc. does not change. The synthesis for reproduction or playback is very similar except that it occurs post-transduction.

Testing & Results

Figure 11:
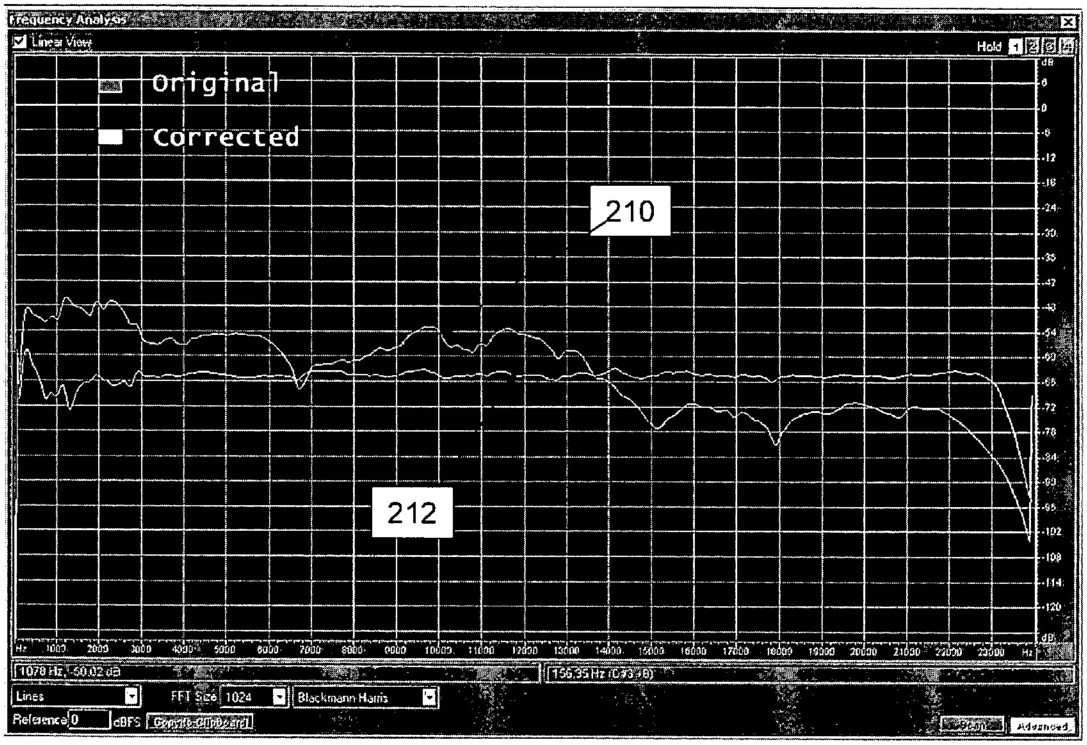
FIG. 11 is a plot of the original and compensated frequency response of the speaker.
Figure 12A:
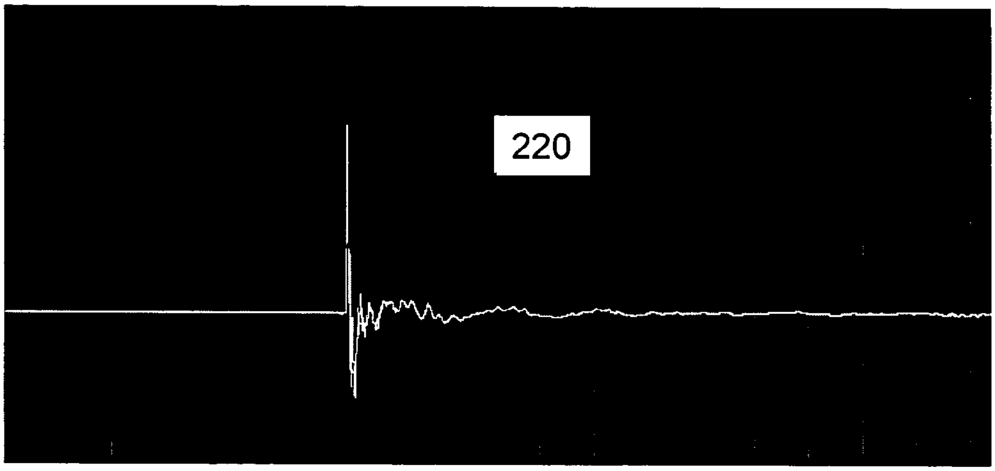
FIGS. 12*a* and 12*b* are plots of the speaker's impulse response before and after compensation, respectively.
Figure 12B:
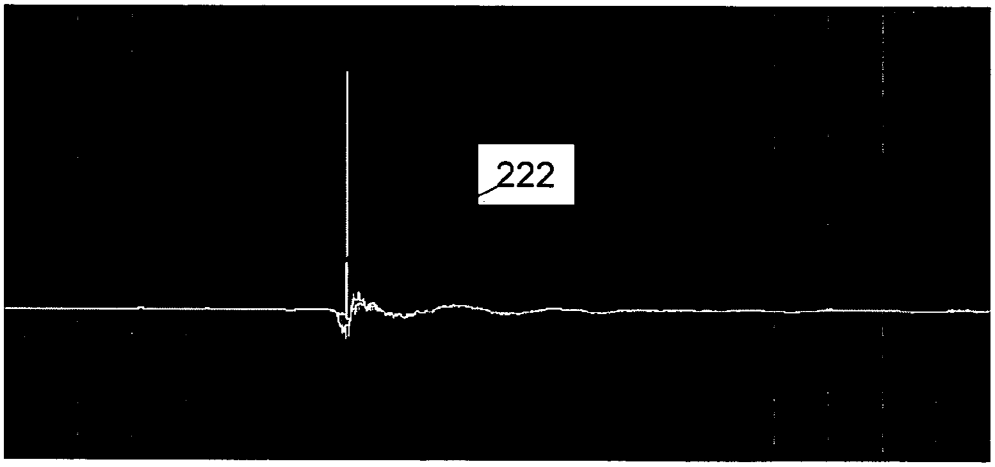

The general approach set-forth of characterizing and compensating for the linear and non-linear distortion components separately and the efficacy of the time-domain neural network based solutions are validated by the frequency and time-domain impulse responses measured for a typical speaker. An impulse is applied to both a speaker with and without correction and the impulse response is recorded. As shown in FIG. 11, the spectrum 210 of the uncorrected impulse response is very non-uniform across an audio bandwidth from 0 Hz to approximately 22 kHz. By comparison, the spectrum 212 of the corrected impulse response is very flat across the entire bandwidth. As shown in FIG. 12*a*, the uncorrected time-domain impulse response 220 includes considerable ringing. If ringing is either long in time or high in amplitude it can be perceived by human ear as a reverberation added to a signal or as coloration (change in spectral characteristics) of the signal. As shown in FIG. 12*b*, the corrected time-domain impulse response 222 is very clean. A clean impulse demonstrates that the frequency characteristics of the system are close to unity gain as was shown in FIG. 10. This is desirable because it adds no coloration, reverberation or other distortions to the signal.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of determining inverse linear and non-linear transfer functions of an audio transducer for precompensating an audio signal for reproduction on the transducer, comprising:

a) Synchronized playback and recording of a linear test signal through the audio transducer;

b) Extracting a forward linear transfer function for the audio transducer from the linear test signal and recorded version thereof;

c) Inverting the forward linear transfer function to provide an estimate of an inverse linear transfer function A( ) for the transducer;

d) Mapping the inverse linear transfer function to corresponding coefficients of a linear filter;

e) Synchronized playback and recording of a non-linear test signal I through the transducer;

f) Applying the linear filter to the recorded non-linear test signal and subtracting the result from the original non-linear test signal to estimate a non-linear distortion of the transducer;

g) Extracting a forward non-linear transfer function F( ) from the non-linear distortion; and h) Inverting the forward non-linear transfer function to provide an estimate of an inverse non-linear transfer function RF( ) for the transducer.

2. The method of claim 1, wherein playback and recording of the linear test signal is performed with reference to a shared clock signal so that the signals are time-aligned to within a single sample period.

3. The method of claim 1, wherein the linear test signal is periodic, said forward linear transfer function being extracted by:

Averaging a plurality of periods of the recorded linear test signal into an averaged recorded signal;

Dividing the averaged recorded signal and the linear test signal into a like plurality of M time segments;

Frequency transforming and ratioing like recorded and test segments to form a like plurality of snapshots each having a plurality of spectral lines;

Filtering each spectral line to select subsets of N<M snapshots all having similar amplitude response for that spectral line;

Mapping the spectral lines from the snapshots enumerated in each subset to reconstruct N snapshots;

Inverse transforming the reconstructed snapshots to provide N time-domain snapshots of the forward linear transfer function; and Wavelet filtering the N time-domain snapshots to extract said forward linear transfer function.

4. The method of claim 3, wherein the averaged recorded signal is divided into as many segments as possible subject to the constraint that each segment must exceed the duration of the transducer impulse response.

5. The method of claim 3, wherein said Wavelet filter is applied in parallel by, Wavelet transforming each time-domain snapshot into a 2-D coefficient map;

Computing a statistic of the coefficients across the maps;

Selectively zeroing coefficients in said 2-D coefficient maps based on the statistics;

Averaging the 2D coefficient maps into an averaged map; and

Inverse Wavelet transforming the averaged map into the forward linear transfer function.

6. The method of claim 5, wherein the statistic measures the deviation between coefficients in the same position from the different maps, said coefficients being zeroed if the deviation exceeds a threshold.

7. The method of claim 1, wherein the forward linear transfer function comprises an impulse response of the audio transducer, said forward linear transfer function is inverted by training the weights of a linear neural network using the impulse response as the input and a target impulse signal as the target to estimate the inverse linear transfer function A( ).

8. The method of claim 7, wherein the weights are trained according to an error function, further comprising placing a time-domain constraint on said error function.

9. The method of claim 8, wherein the time-domain constraint weights errors in a pre-echo portion more heavily.

10. The method of claim 7, wherein the weights are trained according to an error function, further comprising placing a frequency-domain constraint on said error function.

11. The method of claim 10, wherein the frequency-domain constraint attenuates the envelope of the target impulse signal so that the maximum difference between the target impulse signal and the original impulse response is clipped at some preset limit.

12. The method of claim 10, wherein the frequency-domain constraint weights the spectral components of the error function differently.

13. The method of claim 7, wherein the linear neural network comprises N delay elements that pass the input through, N weights on each of the delayed inputs and a single neuron that computes a weighted sum of the delay inputs as an output.

14. The method of claim 1, wherein the forward non-linear transfer function F( ) is extracted by training the weights of a non-linear neural network using the original non-linear test signal I as the input and the non-linear distortion as the target.

15. The method of claim 1, wherein the inverse non-linear transfer function RF( ) is estimated by recursively applying the forward non-linear transfer function F( ) to the test signal I and subtracting Cj*F (I), where Cj is a weighting coefficient for the jth recursive iteration where j is greater than one, from test signal I.

16. A method of determining an inverse linear transfer function A( ) of a transducer for precompensating an audio signal for reproduction on the transducer, comprising:

a) Synchronized playback and recording of a linear test signal through the transducer;

b) Extracting an impulse response for the transducer from the linear test signal and recorded version thereof;

c) Training the weights of a linear neural network using the impulse response as the input and a target impulse signal as the target to provide an estimate of an inverse linear transfer function A( ) for the transducer; and d) Mapping the trained weights from the NN to corresponding coefficients of a linear filter.

17. The method of claim 16, wherein the test signal is periodic, said impulse response being extracted by:

Averaging a plurality of periods of the recorded signal into an averaged recorded signal;

Dividing the averaged recorded signal and the linear test signal into a like plurality of M time segments;

Frequency transforming and ratioing like recorded and test segments to form a like plurality of snapshots each having a plurality of spectral lines;

Filtering each spectral line to select subsets of N<M snapshots all having similar amplitude response for that spectral line;

Mapping the spectral lines from the snapshots enumerated in each subset to reconstruct N snapshots;

Inverse transforming the reconstructed snapshots to provide N time-domain snapshots of the impulse response; and Filtering the N time-domain snapshots to extract said impulse response.

18. The method of claim 17, wherein the time-domain snapshots are filtered in parallel by, Wavelet transforming each time-domain snapshot into a 2-D coefficient map;

Computing statistics of the coefficients across the maps;

Selectively zeroing coefficients in said 2-D coefficient maps based on the statistics;

Averaging the 2D coefficient maps into an averaged map; and

Inverse Wavelet transforming the averaged map into the impulse response.

19. The method of claim 16, wherein the forward linear transfer function is extracted by, Processing the test and recorded signals to provide N time-domain snapshots of the impulse response;

Wavelet transforming each time-domain snapshot into a 2-D coefficient map;

Computing statistics of the coefficients across the maps;

Selectively zeroing coefficients in said 2-D coefficient maps based on the statistics;

Averaging the 2D coefficient maps into an averaged map; and

Inverse Wavelet transforming the averaged map into the impulse response.

20. The method of claim 19, wherein the statistic measures the deviation between coefficients in the same position from the different maps, said coefficients being zeroed if the deviation exceeds a threshold.

21. The method of claim 16, wherein the linear neural network comprises N delay elements that pass the input through, N weights on each of the delayed inputs and a single neuron that computes a weighted sum of the delay inputs as an output.

22. The method of claim 16, wherein the weights are trained according to an error function, further comprising placing a time-domain constraint on said error function.

23. The method of claim 16, wherein the weights are trained according to an error function, further comprising placing a frequency-domain constraint on said error function.

24. A method of determining an inverse non-linear transfer function of a transducer for precompensating an audio signal for reproduction on the transducer, comprising:

a) Synchronized playback and recording off a non-linear test signal I through the transducer;

b) Estimating a non-linear distortion of the transducer from the recorded non-linear test signal;

c) Training the weights of a non-linear neural network using the original non-linear test signal I as the input and the non-linear distortion as the target to provide an estimate of a forward non-linear transfer function F( );

d) recursively applying the forward non-linear transfer function F( ) to the test signal I using the non-linear neural network and subtracting Cj*F(I), where Cj is a weighting coefficient for the jth recursive iteration, from test signal I to estimate an inverse non-linear transfer function RF( ) for the transducer; and e) Optimizing the weighting coefficients Cj.

25. The method of claim 24, wherein the non-linear distortion is estimated by removing the linear distortion from the recorded non-linear test signal and subtracting the result from the original non-linear test signal.

26. The method of claim 24, further comprising:

Training a non-linear playback neural network (PNN) using a non-linear input test signal applied to the non-linear neural network as the input and the output of the recursive application as the target so that the PNN directly estimates the inverse non-linear transfer function RF( ).

27. A method of precompensating an audio signal X for reproduction on an audio transducer, said transducer characterized by an inverse linear transfer function A( ) and an inverse non-linear transfer function RF( ) in which the linear distortion has been removed prior to characterization, comprising:

a) applying the audio signal X to a linear filter whose transfer function is an estimate of the inverse linear transfer function A( ) of the transducer to provide a linear precompensated audio signal X'=A(X); and b) applying the linear precompensated audio signal X' to a non-linear filter whose transfer function is an estimate of the inverse non-linear transfer function RF( ) of the transducer to provide a precompensated audio signal Y=RF(X'), and c) directing the precompensated audio signal Y to the transducer.

28. The method of claim 27, wherein the linear filter comprises an FIR filter whose coefficients are mapped from weights of a linear neural network whose transfer function estimates the transducer's inverse linear transfer function.

29. The method of claim 27, wherein the non-linear filter is implemented by:

applying X' as an input to a neural network whose transfer function F( ) is a representation of the forward non-linear transfer function of the transducer to output an estimate F(X') of the non-linear distortion created by the transducer; and recursively subtracting a weighted non-linear distortion Cj*F(X') from audio signal X' where Cj is a weighting coefficient for the jth recursive iteration to generate the precompensated audio signal Y=RF (X').

30. The method of claim 27, wherein the non-linear filter is implemented by:

passing X' through a non-linear playback neural network whose transfer function is the estimate of the inverse non-linear transfer function RF( ) to generate precompensated audio signal Y=RF(X'), said neural network being trained to emulate the recursive subtraction of Cj*F(I) from audio signal X' where F( ) is a forward non-linear transfer function of the transducer and Cj is a weighting coefficient for the jth recursive iteration.

31. A method of compensating an audio signal I for an audio transducer, comprising:

a) Providing the audio signal I as an input to a neural network whose transfer function F( ) is a representation of the forward non-linear transfer function of the transducer to output an estimate F(I) of the non-linear distortion created by the transducer for audio signal I;

b) recursively subtracting a weighted non-linear distortion Cj*F(I) from audio signal I where Cj is a weighting coefficient for the jth recursive iteration to generate a compensated audio signal Y; and c) directing the compensated audio signal Y to the transducer.

32. A method of compensating an audio signal I for an audio transducer, comprising passing the audio signal I through a non-linear playback neural network whose transfer function RF( ) is an estimate of an inverse non-linear transfer function of the transducer to generate a precompensation audio signal Y and directing precompensation audio signal Y to the audio transducer, said neural network being trained to emulate the recursive subtraction of Cj*F(I) from audio signal I where F( ) is a forward non-linear transfer function of the transducer and Cj is a weighting coefficient for the jth recursive iteration.

* * * * *

UNITED STATES PATENT AND TRADEMARK OFFICE

CERTIFICATE OF CORRECTION

PATENT NO. : 7,593,535 B2
APPLICATION NO. : 11/497484
DATED : September 22, 2009
INVENTOR(S) : Dmitry V. Shmunk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this

Twenty-first Day of September, 2010

David J. Kappos

*Director of the United States Patent and Trademark Office*